(12) United States Patent
Li (10) Patent No.: US 12,041,595 B2
(45) Date of Patent: Jul. 16, 2024

(54) DATA TRANSMISSION METHOD AND APPARATUS (71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 400 days.

(21) Appl. No.: 17/441,574

(22) PCT Filed: Mar. 26, 2019

(86) PCT No.: PCT/CN2019/079752
§ 371 (c)(1),
(2) Date: Sep. 21, 2021

(87) PCT Pub. No.: WO2020/191633
PCT Pub. Date: Oct. 1, 2020

(65) Prior Publication Data
US 2022/0167332 A1 May 26, 2022

(51) Int. Cl.
H04W 72/044 (2023.01)
H04B 7/0408 (2017.01)
(Continued)

(52) U.S. Cl.
CPC ........ *H04W 72/046* (2013.01); *H04B 7/0408* (2013.01); *H04B 7/0602* (2013.01);
(Continued)

(58) Field of Classification Search
CPC ..... H04W 72/046; H04W 48/20; H04W 8/24; H04W 16/28; H04B 7/0602; H04B 7/0695; H04B 7/0408; H04B 7/0628; H04B 7/08
See application file for complete search history.

(56) References Cited

U.S. PATENT DOCUMENTS

2020/0267536 A1* 8/2020 Zhou .................. H04B 7/0404
2022/0217746 A1* 7/2022 Kang ................. H04B 7/06956

FOREIGN PATENT DOCUMENTS

CN 108633062 A 10/2018
CN 109417717 A 9/2019

OTHER PUBLICATIONS

PCT/CN2019/079752 English translation of the International Search Report dated Dec. 27, 2019, 2 pages.
(Continued)

Primary Examiner — Joseph E Dean, Jr.
(74) Attorney, Agent, or Firm — Cozen O'Connor (57) ABSTRACT A data transmission method includes: sending panel capability level information supported by a first device to a second device, wherein the panel capability level information supported by the first device is used for indicating whether two or more panels of the first device can be simultaneously activated and simultaneously used; receiving control information sent by the second device, wherein the control information comprises a target activation panel selected from the panels of the first device by the second device, and the identifier of a corresponding beam on a target use panel selected from the target activation panel by the second device; and performing data transmission with the second device using the corresponding beam on the target use panel.

13 Claims, 5 Drawing Sheets (51) Int. Cl.
    *H04B 7/06*     (2006.01)
    *H04B 7/08*     (2006.01)
    *H04W 8/24*     (2009.01)
    *H04W 48/20*    (2009.01)

(52) U.S. Cl.
    CPC ......... *H04B 7/0628* (2013.01); *H04B 7/0695* (2013.01); *H04B 7/08* (2013.01); *H04W 8/24* (2013.01); *H04W 48/20* (2013.01)

(56) References Cited

OTHER PUBLICATIONS

European Patent Application No. 19922115.1, extended Search and Opinion dated Oct. 12, 2022, 12 pages.
Sony "Considerations on multi-beam operation", 3GPP TSG RAN WG1 Ad-Hoc Meeting 1901, R1-1900378, Jan. 2019, 8 pages.
Nokia et al. "Enhancements on Multi-beam Operation" 3GPP TSG RAN WG1 Meeting #AH-1901 R1-1900692, Jan. 2019, 17 pages.
Apple "Discussion on UE Feature List" 3GPP TSG RAN WG1 Meeting #94, R1-1808610, Aug. 2018, 7 pages.
Vivo "Discussion on Multi-Beam Operation" 3GPP TSG RAN WG1, Ad-Hoc Meeting 1901, R1-1900138, Jan. 2019, 10 pages.

* cited by examiner

DATA TRANSMISSION METHOD AND APPARATUS

CROSS-REFERENCE TO RELATED APPLICATION

The present application is a national stage of International Application No. PCT/CN2019/079752, filed on Mar. 26, 2019, the content of which is hereby incorporated by reference in its entirety.

TECHNICAL FIELD

The disclosure relates to a field of communication technology, in particular to a data transmission method and a data transmission apparatus.

BACKGROUND

In NR, especially when a communication frequency band is in frequency range 2 (above 6 GHz), since a high-frequency channel attenuates rapidly, it is necessary to take use of beam-based transmission and reception to ensure a coverage area.

Currently, a base station uses one panel to send data to a user terminal, and a user terminal uses one panel to receive the data sent by the base station to the user terminal. However, one panel can only point to one beam direction at one time, resulting in insufficient space diversity.

SUMMARY

The embodiments of the disclosure provide a data transmission method and a data transmission apparatus. The technical solution will be described as follows.

Embodiments of the disclosure in a first aspect provide a data transmission method, applied to a first device. The method includes: sending information on a panel capability level supported by the first device to a second device, in which the information on the panel capability level indicates whether two or more panels of the first device can be activated and used simultaneously; receiving control information sent by the second device, in which the control information includes a target activated panel selected from panels of the first device by the second device, and an identifier of a beam corresponding to a target used panel selected from the target activated panel by the second device; and performing data transmission with the second device using the beam corresponding to the target used panel.

Embodiments of the disclosure in a second aspect provide a data transmission method, applied to a second device. The method includes: receiving information on a panel capability level supported by a first device sent by the first device, in which the information on the panel capability level indicates whether two or more panels of the first device can be activated and used simultaneously; selecting a target activated panel from panels of the first device and selecting a beam corresponding to a target used panel from the target activated panel based on the information on the panel capability level; sending control information to the first device, in which the control information contains the target activated panel and an identifier of the beam corresponding to the target used panel; and performing data transmission with the first device using the beam corresponding to the target used panel.

Embodiments of the disclosure in a third aspect provide a data transmission apparatus. The apparatus includes: a processor and a memory for storing instructions executable by the processor. The processor is configured to: send information on a panel capability level supported by a first device to a second device, in which the information on the panel capability level indicates whether two or more panels of the first device can be activated and used simultaneously; receive control information sent by the second device, in which the control information includes a target activated panel selected from panels of the first device by the second device, and an identifier of a beam corresponding to a target used panel selected from the target activated panel by the second device; and perform data transmission with the second device using the beam corresponding to the target used panel.

Embodiments of the disclosure in a forth aspect provide a data transmission apparatus. The apparatus includes: a processor and a memory for storing instructions executable by the processor. The processor is configured to: receive information on a panel capability level supported by a first device sent by the first device, in which the information on the panel capability level indicates whether two or more panels of the first device can be activated and used simultaneously; select a target activated panel from panels of the first device and select a beam corresponding to a target used panel from the target activated panel based on the information on the panel capability level; send control information to the first device, in which the control information contains the target activated panel and an identifier of the beam corresponding to the target used panel; and perform data transmission with the first device using the beam corresponding to the target used panel.

Embodiments of the disclosure in a fifth aspect provide a computer-readable storage medium. At least one instruction is stored in the computer-readable storage medium, and the instruction is loaded and executed by a processor to implement the data transmission method according to the first aspect of the disclosure.

Embodiments of the disclosure in a sixth aspect provide a computer-readable storage medium. At least one instruction is stored in the computer-readable storage medium, and the instruction is loaded and executed by a processor to implement the data transmission method according to the second aspect of the disclosure.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

In the related art, one panel can only point to one beam direction at the same time, so the space diversity is not enough. When a base station has multiple transmission reception points (TRPs) and each TRP has one or more sending panels, or the base station has only one TRP and the TRP has multiple sending panels, the base station can use the multiple panels at the same time to send data to the same user terminal. The multiple panels may belong to the same TRP or different TRPs. In this case, different panels have different sending directions, and the user terminal can also use different panels to receive data, so as to achieve better spatial diversity and improve the reliability of data transmission. However, even if the terminal has multiple panels, factors such as whether the multiple panels can be used at the same time and how long time it takes to switch between the multiple panels, will affect communication performance between the base station and the terminal, resulting in resource waste. Currently, the technical problem of how the base station knows whether the multiple panels of the terminal can be activated and used at the same time is unsolved.

In order to solve the above problems, the embodiments of the disclosure provide a data transmission method, applied to a first device. The method includes: sending information on a panel capability level supported by the first device to a second device, in which the information on the panel capability level indicates whether two or more panels of the first device can be activated and used simultaneously; receiving control information sent by the second device, in which the control information includes a target activated panel selected from panels of the first device by the second device, and an identifier of a beam corresponding to a target used panel selected from the target activated panel by the second device; and performing data transmission with the second device using the beam corresponding to the target used panel. In the data transmission method according to the embodiments of the disclosure, the first device reports its own capability level information about multiple panels to the second device, so that the second device can timely and accurately learn whether two or more panels of the first device can be activated and used at the same time, and the second device can better use multiple panels to transmit data with the first device, which may improve space diversity performance, reliability and robustness of the data transmission.

It should be noted that the first device may include devices such as smart phones, tablets, desktops, laptops, drones, or wearable devices (such as bracelets, and smart glasses), and the second device may include devices, such as base stations; or, the first device and the second device may be, for example, devices such as vehicle-mounted devices, roadside devices, or user handheld devices in Vehicle to Everything (V2x).

Based on the above analysis, the following specific embodiments are provided.

Figure 1:
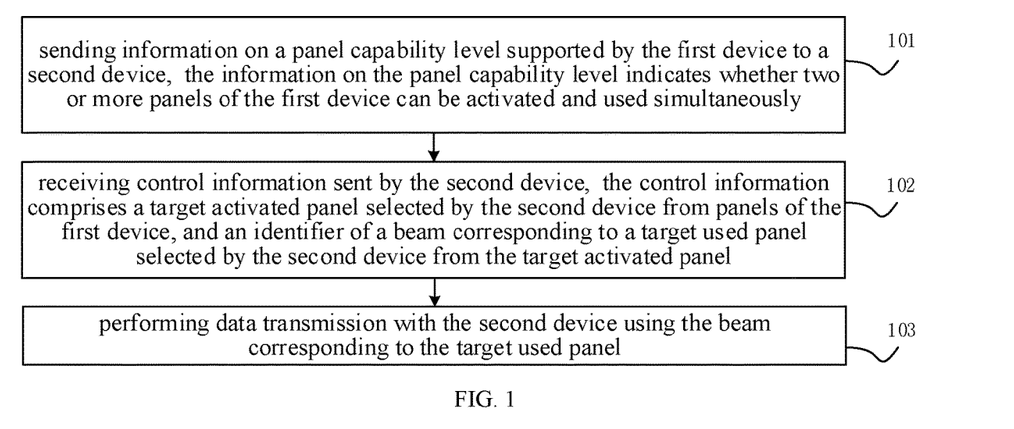
FIG. 1 is a flowchart of a data transmission method according to an embodiment.

FIG. 1 is a flowchart of a data transmission method according to an embodiment. The execution subject of the data transmission method in the embodiments of the disclosure may be the first device. As illustrated in FIG. 1, the method includes 101-103.

In 101, information on a panel capability level supported by the first device is transmitted to the second device. The information on the panel capability level indicates whether two or more panels of the first device can be activated and used simultaneously.

For example, the information on the panel capability level supported by the first device includes at least any of the following.

a) information on panel capability level 1, any two or more of the panels included in the device do not support simultaneous activation. Taking the first device as an example, the first device has multiple panels, but the multiple panels cannot be activated and used at the same time. Switching time between panels is at least equal to activation time of the panels, such as tens of ms. The switching time is long.

b) information on panel capability level 2, each panel included in the device supports simultaneous activation and does not support simultaneous use. Taking the first device as an example, the first device has multiple panels, the multiple panels can be activated at the same time but cannot be used at the same time. For example, 1) the switching time between two panels is T1, for example, a value range of T1 is 2-3 ms; 2) the switching time between two panels is T2, for example, a value of T2 is at microsecond level.

It should be noted that in the information on the panel capability level 2, if the switching delay between two panels is T1 or T2, the first device will not be able to receive any information sent by the second device or send any information to the second device during the panel switching time. If there is a DCI signaling or a RRC signaling indicating that the first device needs to transmit information with the second device during this period, the second device can send the information again after the switching time, or the first device can send the information to the second device again after the switching time. A specific time offset can be notified to the first device by the second device in advance using the RRC signaling, or can be a default value stored in a chip of the first device, or can be notified to the first device again using a new DCI signaling.

c) information on panel capability level 3, each panel included in the device supports simultaneous activation and simultaneous use. Taking the first device as an example, the first device has multiple panels, and the multiple panels can be activated or used at the same time. For example, a) when the multiple panels are used at the same time, the maximum power of each panel is P1, for example, P1 may be 23 dBm; B) when the multiple panels are used at the same time, the maximum power of each panel is P2, for example, P2 may be 20 dBm; c) when the multiple panels are used at the same time, the maximum power of some panels is P1, for example, P1 may be 23 dBm; the maximum power of some panels is P2, P2 may be 20 dBm.

For example, in addition to indicating whether more than two panels of the device can be activated and used simultaneously, the information on the panel capability level may also include information such as the switching time between different panels and the maximum power of each panel. Alternatively, information such as the switching time between panels corresponding to different information on panel capability levels and the maximum power of each panel can be set in the second device, such as a base station, in advance.

For example, after receiving the information on the panel capability level supported by the first device from the first device, the second device selects a target activated panel from panels included in the first device and selects a beam corresponding to a target used panel from the target activated panel according to the information on the panel capability level supported by the first device. The control information is sent to the first device, the control information includes the target activated panel, and an identifier of the beam corresponding to the target used panel. For example, the second device uses target DCI format corresponding to the information on the panel capability level supported by the first device to send the control information to the first device, and the target DCI is configured to indicate a beam direction of the target used panel.

In 102, control information sent by the second device is received. The control information includes the target activated panel selected from panels of the first device by the second device, and the identifier of the beam corresponding to the target used panel selected from the target activated panel by the second device.

For example, the first device receives the control information sent by the second device by monitoring the target DCI corresponding to the information on the panel capability level supported by the first device. The target DCI is used to indicate the beam direction of the target used panel selected from the target activated panel by the second device.

In 103, data transmission is performed with the second device using the beam corresponding to the target used panel.

For example, the data transmission between the first device and the second device is performed by using the beam corresponding to the target used panel.

In the technical solution of the embodiments of the disclosure, the first device reports its own capability level information about the multiple panels to the second device, so that the second device can timely and accurately learn whether two or more panels of the first device can be activated and used at the same time, and the second device can better use the multiple panels to transmit data with the first device, which may improve space diversity performance, reliability and robustness of the data transmission.

Figure 2:
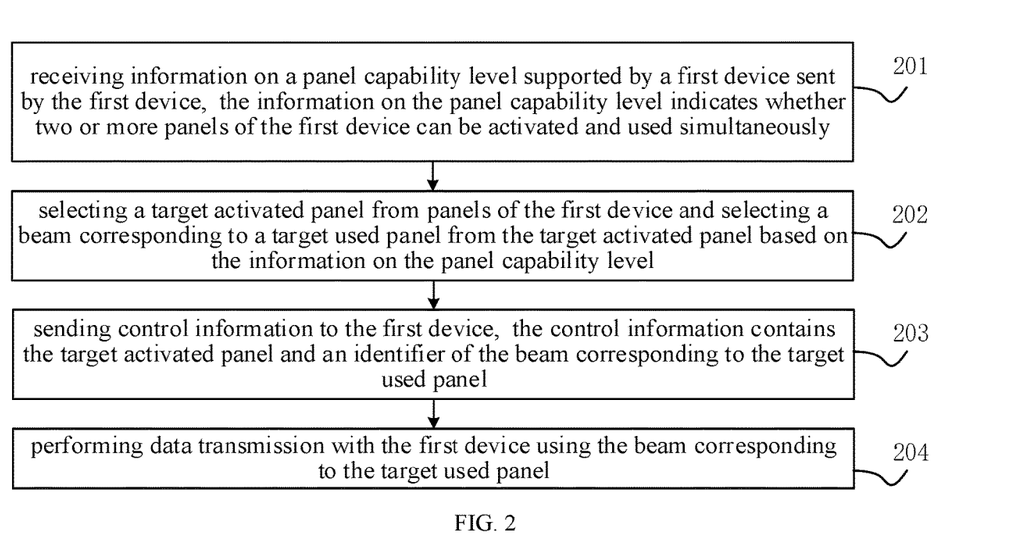
FIG. 2 is a flowchart of a data transmission method according to an embodiment.

FIG. 2 is a flowchart of a data transmission method according to an embodiment. The execution subject of the data transmission method in the embodiments of the disclosure may be the second device. As illustrated in FIG. 2, the method includes 201-204.

In 201, information on a panel capability level supported by a first device sent by the first device is received. The information on the panel capability level indicates whether two or more panels of the first device can be activated and used simultaneously.

In 202, a target activated panel is selected from panels of the first device and a beam corresponding to a target used panel is selected from the target activated panel based on the information on the panel capability level.

For example, after obtaining the information on the panel capability level of the first device, the second device schedules the first device to use different panels according to the information on the panel capability level supported by the first device. For example, the first device is a terminal and the second device is a base station.

For the information on panel capability level 1, the base station uses a MAC signaling to activate one panel in the panels of the first device, and beam information identifier indicated by the DCI is the beam corresponding to the activated panel. If the panel needs to be switched, it is sufficient to activate a new panel by using a new MAC signaling, and a DCI format needs to be monitored and detected by the terminal is a format used to indicate the beam direction of the panel and corresponding to the information on panel capability level 1, such as format #1.

For the information on panel capability level 2, in addition to the usage of the information on panel capability level 1, the base station can also activate multiple panels at the same time. The DCI signaling indicates the beam corresponding to one of the multiple panels. Then the DCI format needs to be monitored and detected by the terminal is a format used to indicate the beam direction of one of the multiple panels and corresponding to the information on panel capability level 2, such as format #2.

For the information on panel capability level 3, in addition to the usage of the information on panel capability level 1, the base station can also activate multiple panels at the same time. The DCI signaling indicates the beams corresponding to some or all of the multiple panels, then the DCI format needs to be monitored and detected by the terminal is a format used to indicate respective beam directions of some or all of the multiple panels and corresponding to the information on panel capability level 3, such as format #3.

In 203, control information is sent to the first device. The control information contains the target activated panel and an identifier of the beam corresponding to the target used panel.

In 204, data transmission is performed with the first device using the beam corresponding to the target used panel.

In the technical solution of the embodiments of the disclosure, the first device reports its own capability level information about multiple panels to the second device, so that the second device can timely and accurately learn whether two or more panels of the first device can be activated and used at the same time, and the second device can better use multiple panels for data transmission with the first device, which may relief waste of resources or reduced throughput due to inconsistency between knowledge of the first device and the second device on whether two or more panels of the first device can be activated and used at the same time. Therefore, space diversity performance is improved, and reliability and robustness of the data transmission can be increased.

Figure 3:
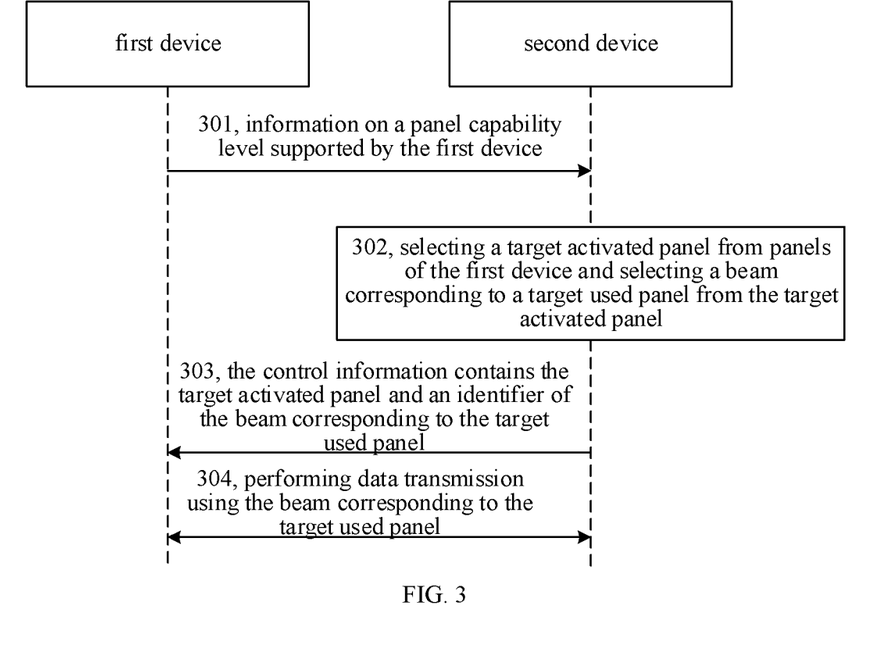
FIG. 3 is a flowchart of a data transmission method according to an embodiment.

FIG. 3 is a flowchart of a data transmission method according to an embodiment. The execution subject of the data transmission method in the embodiments of the disclosure may be the first device and the second device. As illustrated in FIG. 3, the method includes 301-304. The parts that are not described in detail in this embodiment can be referred to the corresponding description of the embodiment in FIG. 1.

In 301, the first device sends information on a panel capability level supported by the first device to the second device, in which the information on the panel capability level indicates whether two or more panels of the first device can be activated and used simultaneously, and the second device receives the information on the panel capability level supported by the first device.

For example, the information on the panel capability level supported by the first device includes at least any of the following information: any two or more of the panels of the first device fail to support simultaneous activation; or, each panel of the first device supports simultaneous activation and fails to support simultaneous use; or, each panel of the first device supports both simultaneous activation and simultaneous use.

In 302, according to the information on the panel capability level supported by the first device, the second device selects a target activated panel from panels included in the first device, and selects a beam corresponding to a target used panel from the target activated panel.

In 303, the second device sends control information to the first device, in which the control information includes the target activated panel and an identifier of the beam corresponding to the target used panel, and the first device receives the control information sent by the second device.

In 304, the second device uses the beam corresponding to the target used panel to perform data transmission with the first device.

For example, the data transmission between the first device and the second device is performed using the beam corresponding to the target used panel.

In the technical solution of the embodiments of the disclosure, the first device reports its own capability level information about multiple panels to the second device, so that the second device can timely and accurately learn whether two or more panels of the first device can be activated and used at the same time, and the second device can better use multiple panels for data transmission with the first device, which may relief waste of resources or reduced throughput due to inconsistency between knowledge of the first device and the second device on whether two or more panels of the first device can be activated and used at the same time. Therefore, space diversity performance is improved, and reliability and robustness of the data transmission are increased.

The following are device embodiments of the disclosure, which can be used to implement the method embodiments of the disclosure. For parts of the device embodiments that are not described in detail, reference may be made to the method embodiments.

Figure 4:
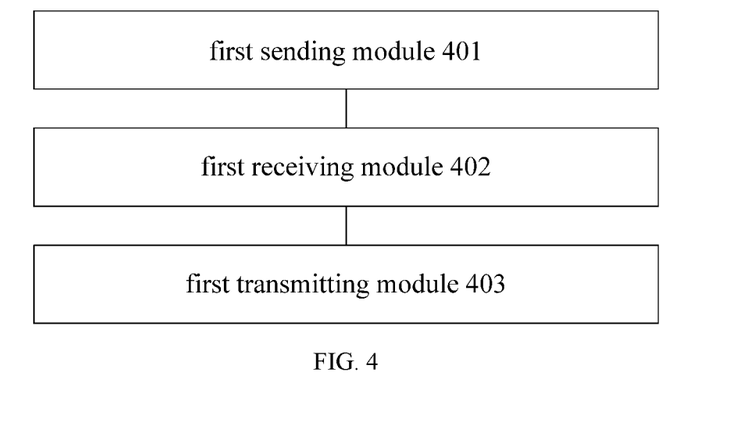
FIG. 4 is a block diagram of a data transmission apparatus according to an embodiment.

FIG. 4 is a block diagram of a data transmission apparatus according to an embodiment. The apparatus can be applied to the first device. As illustrated in FIG. 4, the data transmission apparatus includes: a first sending module 401, a first receiving module 402, and a first transmitting module 403.

The first sending module 401 is configured to send information on a panel capability level supported by the first device to a second device, in which the information on the panel capability level indicates whether two or more panels of the first device can be activated and used simultaneously.

The first receiving module 402 is configured to receive control information sent by the second device, in which the control information includes a target activated panel selected from panels of the first device by the second device, and an identifier of a beam corresponding to a target used panel selected from the target activated panel by the second device.

The first transmitting module 403 is configured to perform data transmission with the second device using the beam corresponding to the target used panel.

In the technical solution of the embodiments of the disclosure, the first device reports its own capability level information about multiple panels to the second device, so that the second device can timely and accurately learn whether two or more panels of the first device can be activated and used at the same time, and the second device can better use multiple panels to transmit data with the first device, which may improve space diversity performance, and reliability and robustness of the data transmission.

In an embodiment, the information on the panel capability level supported by the first device includes at least any of the following information:

any two or more of the panels of the first device fail to support simultaneous activation; or, each panel of the first device supports simultaneous activation and fails to support simultaneous use; or, each panel of the first device supports both simultaneous activation and simultaneous use.

In an embodiment, the first receiving module 402 is configured to: receive the control information sent by the second device by monitoring target downlink control information (DCI) corresponding to the information on the panel capability level supported by the first device, in which the target DCI is configured to indicate a beam direction of the target used panel selected from the target activated panel by the second device.

Figure 5:
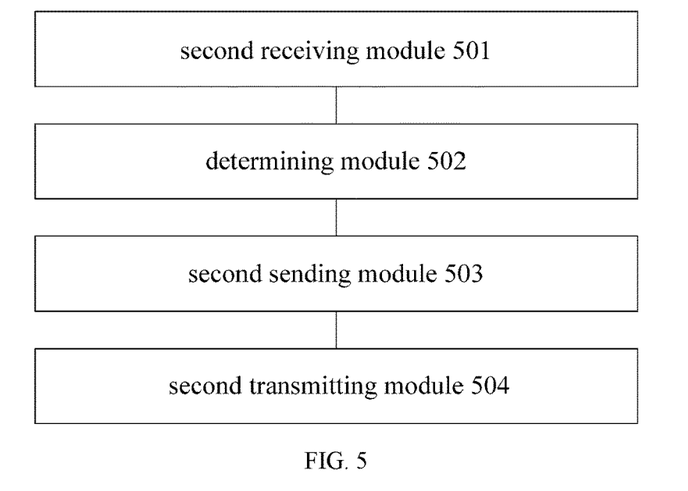
FIG. 5 is a block diagram of a data transmission apparatus according to an embodiment.

FIG. 5 is a block diagram of a data transmission apparatus according to an embodiment. The apparatus can be applied to the second device. As illustrated in FIG. 5, the data transmission apparatus includes: a second receiving module 501, a determining module 502, a second sending module 503, and a second transmitting module 504.

The second receiving module 501 is configured to receive information on a panel capability level supported by a first device sent by the first device, the information on the panel capability level indicates whether two or more panels of the first device can be activated and used simultaneously.

The determining module 502 is configured to select a target activated panel from panels of the first device and select a beam corresponding to a target used panel from the target activated panel based on the information on the panel capability level.

The second sending module 503 is configured to send control information to the first device, in which the control information contains the target activated panel and an identifier of the beam corresponding to the target used panel.

The second transmitting module 504 is configured to perform data transmission with the first device using the beam corresponding to the target used panel.

In the technical solution of the embodiments of the disclosure, the first device reports its own capability level information about the multiple panels to the second device, so that the second device can timely and accurately learn whether two or more panels of the first device can be activated and used at the same time, and the second device can better use multiple panels to transmit data with the first device, which may improve the space diversity performance, and the reliability and robustness of data transmission.

In an embodiment, the information on the panel capability level supported by the first device includes at least any of the following information:

any two or more of the panels of the first device fail to support simultaneous activation; or, each panel of the first device supports simultaneous activation and fails to support simultaneous use; or, each panel of the first device supports both simultaneous activation and simultaneous use.

In an embodiment, the second sending module 503 is configured to: send the control information to the first device by using target downlink control information (DCI) corresponding to the information on the panel capability level supported by the first device, in which the target DCI is configured to indicate a beam direction of the target used panel.

Figure 6:
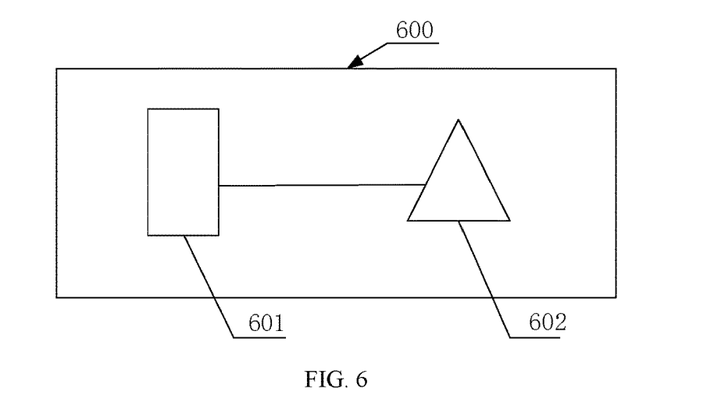
FIG. 6 is a block diagram of a data transmission apparatus according to an embodiment.

FIG. 6 is a block diagram of a data transmission apparatus 600 according to an embodiment, which is applied to the first device. The data transmission apparatus 600 includes: a processor 601 and a memory 602 for storing instructions executable by processor. The processor 601 is configured to: send information on a panel capability level supported by the first device to a second device, in which the information on the panel capability level indicates whether two or more panels of the first device can be activated and used simultaneously; receive control information sent by the second device, in which the control information includes a target activated panel selected from panels of the first device by the second device, and an identifier of a beam corresponding to a target used panel selected from the target activated panel by the second device; and perform data transmission with the second device using the beam corresponding to the target used panel.

In an embodiment, the information on the panel capability level supported by the first device includes at least any of the following information:

any two or more of the panels of the first device fail to support simultaneous activation; or, each panel of the first device supports simultaneous activation and fails to support simultaneous use; or, each panel of the first device supports both simultaneous activation and simultaneous use.

In an embodiment, the processor 601 is configured to: send the control information to the first device by using target downlink control information (DCI) corresponding to the information on the panel capability level supported by the first device, in which the target DCI is configured to indicate a beam direction of the target used panel.

Figure 7:
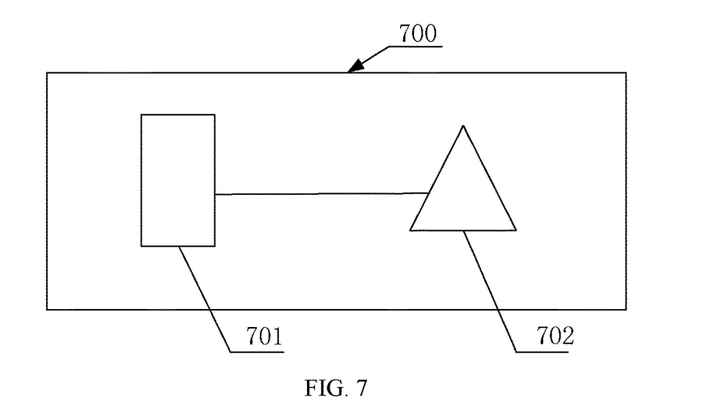
FIG. 7 is a block diagram of a data transmission apparatus according to an embodiment.

FIG. 7 is a block diagram of a data transmission apparatus 700 according to an embodiment, which is applied to the second device. The data transmission apparatus 700 includes: a processor 701 and a memory 702 for storing instructions executable by the processor. The processor 701 is configured to: receive information on a panel capability level supported by a first device sent by the first device, in which the information on the panel capability level indicates whether two or more panels of the first device can be activated and used simultaneously; select a target activated panel from panels of the first device and select a beam corresponding to a target used panel from the target activated panel based on the information on the panel capability level; send control information to the first device, in which the control information contains the target activated panel and an identifier of the beam corresponding to the target used panel; and perform data transmission with the first device using the beam corresponding to the target used panel.

In an embodiment, the information on the panel capability level supported by the first device includes at least any of the following information:

any two or more of the panels of the first device fail to support simultaneous activation; or, each panel of the first device supports simultaneous activation and fails to support simultaneous use; or, each panel of the first device supports both simultaneous activation and simultaneous use.

In an embodiment, the processor 701 is configured to: send the control information to the first device by using target downlink control information (DCI) corresponding to the information on the panel capability level supported by the first device, in which the target DCI is configured to indicate a beam direction of the target used panel.

Regarding the apparatus in the foregoing embodiment, the specific manner in which each module performs operation has been described in detail in the embodiments of the method, and detailed description will not be given here.

Figure 8:
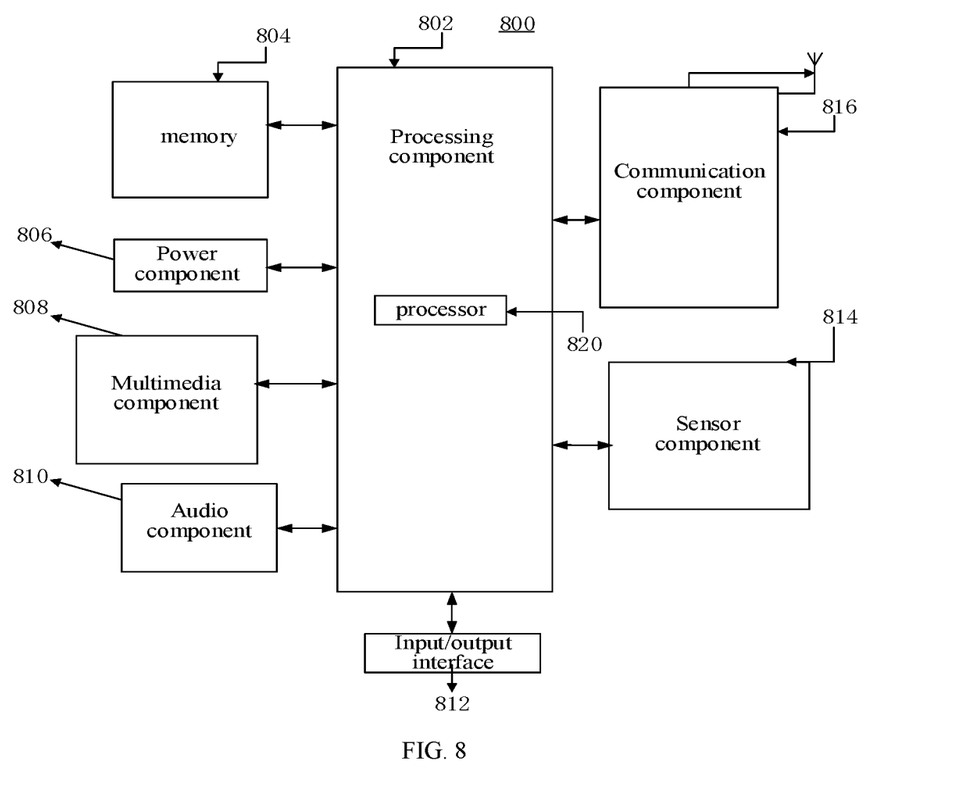
FIG. 8 is a block diagram of a data transmission apparatus according to an embodiment.

FIG. 8 is a block diagram of a data transmission apparatus 800 according to an embodiment. The data transmission apparatus 800 is suitable for a first device. The data transmission 800 may include one or more of the following: a processing component 802, a memory 804, and a power supply component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the above described method. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the user equipment 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front-facing camera and/or a rear-facing camera. When the apparatus 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 can access a wireless network based on a communication standard, such as WiFi, 2G, or 3G, or a combination thereof. In an embodiment, the communication component 816 receives a broadcast signal or broadcast associated information from an external broadcast management system via a broadcast channel. In an embodiment, the communication component 816 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In embodiments, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In embodiments, there is also provided a non-transitory computer readable storage medium including instructions, such as included in the memory 804, executable by the processor 820 in the apparatus 800, for performing the above method. For example, the non-transitory computer-readable storage medium may be a ROM, a RAM, a CD-ROM, a magnetic tape, a floppy disc, an optical data storage device, and the like.

When the instructions in the storage medium are executed by the processor, the data transmission apparatus 800 can execute the following method. The method includes: sending information on a panel capability level supported by the first device to a second device, in which the information on the panel capability level indicates whether two or more panels of the first device can be activated and used simultaneously; receiving control information sent by the second device, in which the control information includes a target activated panel selected from panels of the first device by the second device, and an identifier of a beam corresponding to a target used panel selected from the target activated panel by the second device; and performing data transmission with the second device using the beam corresponding to the target used panel.

In an embodiment, the information on the panel capability level supported by the first device includes at least any of the following information:
 any two or more of the panels of the first device fail to support simultaneous activation; or,
 each panel of the first device supports simultaneous activation and fails to support simultaneous use; or,
 each panel of the first device supports both simultaneous activation and simultaneous use.

In an embodiment, receiving the control information sent by the second device includes: receiving the control information sent by the second device by monitoring target downlink control information (DCI) corresponding to the information on the panel capability level supported by the first device, in which the target DCI is configured to indicate a beam direction of the target used panel selected from the target activated panel by the second device.

Figure 9:
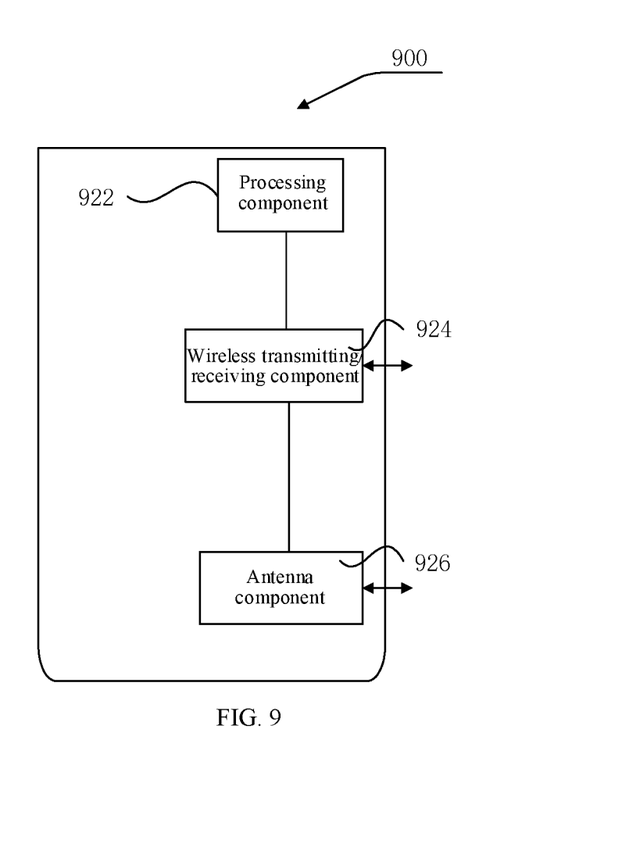
FIG. 9 is a block diagram of a data transmission apparatus according to an embodiment.

FIG. 9 is a block diagram of a data transmission apparatus according to an embodiment. As illustrated in FIG. 9, the data transmission apparatus 900 may be provided as the second device, the data transmission device 900 includes a processing component 922, a wireless transmitting/receiving component 924, an antenna component 926, and a signal processing part specific to a wireless interface. The processing component 922 may further include one or more processors.

One of the processors in the processing component 922 may be configured to execute the following. The method includes: receiving information on a panel capability level supported by a first device sent by the first device, in which the information on the panel capability level indicates whether two or more panels of the first device can be activated and used simultaneously; selecting a target activated panel from panels of the first device and selecting a beam corresponding to a target used panel from the target activated panel based on the information on the panel capability level; sending control information to the first device, in which the control information contains the target activated panel and an identifier of the beam corresponding to the target used panel; and performing data transmission with the first device using the beam corresponding to the target used panel.

In an embodiment, the information on the panel capability level supported by the first device includes at least any of the following information:
 any two or more of the panels of the first device fail to support simultaneous activation; or,
 each panel of the first device supports simultaneous activation and fails to support simultaneous use; or, each panel of the first device supports both simultaneous activation and simultaneous use.

In an embodiment, sending the control information to the first device includes: sending the control information to the first device by using target downlink control information (DCI) corresponding to the information on the panel capability level supported by the first device, in which the target DCI is configured to indicate a beam direction of the target used panel.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

The technical solution of the embodiments of the disclosure may include the following beneficial effects. In this technical solution, the first device reports its own capability level information about multiple panels to the second device, the second device can timely and accurately learn whether more than two panels of the first device can be activated and used simultaneously, so that it is convenient for the second device to better use multiple panels for data transmission with the first device, which may improve space diversity performance, reliability and robustness of the data transmission.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A data transmission method, applied to a first device, comprising:
    sending information on a panel capability level supported by the first device to a second device, wherein the information on the panel capability level indicates whether two or more panels of the first device can be activated and used simultaneously, a switching time between different panels and a maximum power of each panel;
    receiving control information sent by the second device, wherein the control information comprises a target activated panel selected from panels of the first device by the second device, and an identifier of a beam corresponding to a target used panel selected from the target activated panel by the second device; and
    performing data transmission with the second device using the beam corresponding to the target used panel.

2. The method of claim 1, wherein the information on the panel capability level supported by the first device comprises at least one piece of information selected from the group consisting of:
    any two or more of the panels of the first device fail to support simultaneous activation;
    each panel of the first device supports simultaneous activation and fails to support simultaneous use; and
    each panel of the first device supports both simultaneous activation and simultaneous use.

3. The method of claim 1, wherein receiving the control information sent by the second device comprises:
    receiving the control information sent by the second device by monitoring target downlink control information (DCI) corresponding to the information on the panel capability level supported by the first device, wherein the target DCI is configured to indicate a beam direction of the target used panel selected from the target activated panel by the second device.

4. A data transmission method, applied to a second device, comprising:
    receiving information on a panel capability level supported by a first device sent by the first device, wherein the information on the panel capability level indicates whether two or more panels of the first device can be activated and used simultaneously, a switching time between different panels and a maximum power of each panel;
    selecting a target activated panel from panels of the first device and selecting a beam corresponding to a target used panel from the target activated panel based on the information on the panel capability level;
    sending control information to the first device, wherein the control information contains the target activated panel and an identifier of the beam corresponding to the target used panel; and
    performing data transmission with the first device using the beam corresponding to the target used panel.

5. The method of claim 4, wherein the information on the panel capability level supported by the first device comprises at least one piece of information selected from the group consisting of:
    any two or more of the panels of the first device fails to support simultaneous activation;
    each panel of the first device supports simultaneous activation and fails to support simultaneous use; and
    each panel of the first device supports both simultaneous activation and simultaneous use.

6. The method of claim 4, wherein sending the control information to the first device comprises:
    sending the control information to the first device by using target downlink control information (DCI) corresponding to the information on the panel capability level supported by the first device, wherein the target DCI is configured to indicate a beam direction of the target used panel.

7. A data transmission apparatus, comprising:
    a processor;
    a memory for storing instructions executable by the processor; wherein,
    the processor is configured to:
    send information on a panel capability level supported by data transmission apparatus to a second data transmission apparatus, wherein the information on the panel capability level indicates whether two or more panels of the data transmission apparatus can be activated and used simultaneously, a switching time between different panels and a maximum power of each panel;
    receive control information sent by the second data transmission apparatus, wherein the control information comprises a target activated panel selected from panels of the data transmission apparatus by the second data transmission apparatus, and an identifier of a beam corresponding to a target used panel selected from the target activated panel by the second data transmission apparatus; and
    perform data transmission with the second data transmission apparatus using the beam corresponding to the target used panel.

8. A data transmission apparatus, comprising:
a processor;
a memory for storing executable instructions; wherein,
the processor is configured to implement the method of claim 4.

9. The method of claim 2, wherein receiving the control information sent by the second device comprises:
receiving the control information sent by the second device by monitoring target downlink control information (DCI) corresponding to the information on the panel capability level supported by the first device, wherein the target DCI is configured to indicate a beam direction of the target used panel selected from the target activated panel by the second device.

10. The method of claim 5, wherein sending the control information to the first device comprises:
sending the control information to the first device by using target downlink control information (DCI) corresponding to the information on the panel capability level supported by the first device, wherein the target DCI is configured to indicate a beam direction of the target used panel.

11. The apparatus of claim 7, wherein the information on the panel capability level supported by the data transmission apparatus comprises at least one piece of information selected from the group consisting of:
any two or more of the panels of the data transmission apparatus fails to support simultaneous activation;
each panel of the data transmission apparatus supports simultaneous activation and fails to support simultaneous use; and
each panel of the data transmission apparatus supports both simultaneous activation and simultaneous use.

12. The apparatus of claim 7, wherein receiving the control information sent by the second data transmission apparatus comprises:
receiving the control information sent by the second data transmission apparatus by monitoring target downlink control information (DCI) corresponding to the information on the panel capability level supported by the data transmission apparatus, wherein the target DCI is configured to indicate a beam direction of the target used panel selected from the target activated panel by the second data transmission apparatus.

13. The apparatus of claim 11, wherein receiving the control information sent by the second data transmission apparatus comprises:
receiving the control information sent by the second data transmission apparatus by monitoring target downlink control information (DCI) corresponding to the information on the panel capability level supported by the data transmission apparatus, wherein the target DCI is configured to indicate a beam direction of the target used panel selected from the target activated panel by the second data transmission apparatus.

* * * * *